United States Patent
Ohta et al.

(10) Patent No.: US 10,701,737 B2
(45) Date of Patent: *Jun. 30, 2020

(54) TERMINAL DEVICE, BASE STATION DEVICE, WIRELESS COMMUNICATION SYSTEM, AND SCHEDULING REQUEST METHOD

(71) Applicant: FUJITSU LIMITED, Kawasaki-shi, Kanagawa (JP)

(72) Inventors: Yoshiaki Ohta, Yokohama (JP); Yoshihiro Kawasaki, Kawasaki (JP); Takayoshi Ode, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/689,512

(22) Filed: Nov. 20, 2019

(65) Prior Publication Data
US 2020/0092920 A1    Mar. 19, 2020

Related U.S. Application Data

(63) Continuation of application No. 16/225,276, filed on Dec. 19, 2018, now Pat. No. 10,555,349, which is a
(Continued)

(51) Int. Cl.
*H04W 74/08* (2009.01)
*H04W 76/30* (2018.01)
(Continued)

(52) U.S. Cl.
CPC ... *H04W 74/0833* (2013.01); *H04W 28/0278* (2013.01); *H04W 72/1284* (2013.01);
(Continued)

(58) Field of Classification Search
CPC ............. H04W 74/0833; H04W 76/30; H04W 28/0278; H04W 72/1284; H04W 72/14; H04W 80/02
See application file for complete search history.

(56) References Cited

U.S. PATENT DOCUMENTS 7,957,298 B2 * 6/2011 Yi ........................ H04W 74/002
370/242
2010/0035581 A1 * 2/2010 Park ...................... H04W 74/08
455/412.1
(Continued)

OTHER PUBLICATIONS

3GPP TS 36.211 V15.1.0,"3rd Generation Partnership Project; Technical Specification Group Radio Access Network; Evolved Universal Terrestrial Radio Access (E-UTRA); Physical channels and modulation (Release 15)", Mar. 2018.
(Continued)

*Primary Examiner* — Saad A. Waqas
(74) *Attorney, Agent, or Firm* — Myers Wolin, LLC (57) ABSTRACT

A terminal device includes: a transmitter configured to transmit a scheduling request for an uplink (UL) resource; and control circuitry configured to stop an ongoing random access procedure when a media access control protocol data unit (MAC PDU) is transmitted using a configured Uplink (UL) grant other than a UL grant provided by a random access response in the random access procedure, wherein the configured UL grant indicates a resource configured prior to the ongoing random access procedure, wherein the MAC PDU includes a buffer status prior to the MAC PDU assembly.

18 Claims, 3 Drawing Sheets

Related U.S. Application Data continuation of application No. PCT/JP2018/017679, filed on May 7, 2018.

(51) Int. Cl.
| | | |
|---|---|---|
| *H04W 28/02* | (2009.01) | |
| *H04W 72/14* | (2009.01) | |
| *H04W 72/12* | (2009.01) | |
| *H04W 80/02* | (2009.01) | |

(52) U.S. Cl.
CPC ........... *H04W 72/14* (2013.01); *H04W 76/30* (2018.02); *H04W 80/02* (2013.01)

(56) References Cited

U.S. PATENT DOCUMENTS

| | | | | |
|---|---|---|---|---|
| 2014/0177573 | A1* | 6/2014 | Han | H04L 5/0044 370/329 |
| 2017/0245245 | A1* | 8/2017 | Kim | H04W 72/1284 |
| 2018/0139668 | A1* | 5/2018 | Takahashi | H04W 74/0833 |

OTHER PUBLICATIONS

3GPP TS 36.212 V15.1.0, "3rd Generation Partnership Project; Technical Specification Group Radio Access Network; Evolved Universal Terrestrial Radio Access (E-UTRA); Multiplexing and channel coding (Release 15)", Mar. 2018.
3GPP TS 36.213 V15.1.0, "3rd Generation Partnership Project; Technical Specification Group Radio Access Network; Evolved Universal Terrestrial Radio Access (E-UTRA); Physical layer procedures (Release 15)", Mar. 2018.
3GPP TS 36.300 V15.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Mar. 2018.
3GPP TS 36.321 V15.1.0, "3rd Generation Partnership Project; Technical Specification Group Radio Access Network; Evolved Universal Terrestrial Radio Access (E-UTRA); Medium Access Control (MAC) protocol specification (Release 15)", Mar. 2018.
3GPP TS 36.322 V15.0.1, "3rd Generation Partnership Project; Technical Specification Group Radio Access Network; Evolved Universal Terrestrial Radio Access (E-UTRA); Radio Link Control (RLC) protocol specification (Release 15)", Apr. 2018.
3GPP TS 36.323 V14.5.0, "3rd Generation Partnership Project; Technical Specification Group Radio Access Network; Evolved Universal Terrestrial Radio Access (E-UTRA); Packet Data Convergence Protocol (PDCP) specification (Release 14)", Dec. 2017.
3GPP TS 36.331 V15.1.0, "3rd Generation Partnership Project; Technical Specification Group Radio Access Network; Evolved Universal Terrestrial Radio Access (E-UTRA); Radio Resource Control (RRC); Protocol specification (Release 15)", Mar. 2018.
3GPP TS 36.413 V15.1.0, "3rd Generation Partnership Project; Technical Specification Group Radio Access Network; Evolved Universal Terrestrial Radio Access Network (E-UTRAN); S1 Application Protocol (S1AP) (Release 15)", Mar. 2018.
3GPP TS 36.423 V15.1.0, "3rd Generation Partnership Project; Technical Specification Group Radio Access Network; Evolved Universal Terrestrial Radio Access Network (E-UTRAN); X2 application protocol (X2AP) (Release 15)", Mar. 2018.
3GPP TS 36.425 V14.1.0, "3rd Generation Partnership Project; Technical Specification Group Radio Access Network; Evolved Universal Terrestrial Radio Access Network (E-UTRAN); X2 interface user plane protocol (Release 14)", Mar. 2018.
3GPP TS 37.340 V15.1.0, "3rd Generation Partnership Project; Technical Specification Group Radio Access Network; Evolved Universal Terrestrial Radio Access (E-UTRA) and NR; Multi-connectivity; Stage 2 (Release 15)", Mar. 2018.
3GPP TS 38.201 V15.0.0, "3rd Generation Partnership Project; Technical Specification Group Radio Access Network; NR; Physical layer; General description (Release 15)", Dec. 2017.
3GPP TS 38.202 V15.1.0, "3rd Generation Partnership Project; Technical Specification Group Radio Access Network; NR; Services provided by the physical layer (Release 15)", Mar. 2018.
3GPP TS 38.211 V15.1.0, "3rd Generation Partnership Project; Technical Specification Group Radio Access Network; NR; Physical channels and modulation (Release 15)", Mar. 2018.
3GPP TS 38.212 V15.1.1, "3rd Generation Partnership Project; Technical Specification Group Radio Access Network; NR; Multiplexing and channel coding (Release 15)", Apr. 2018.
3GPP TS 38.213 V15.1.0, "3rd Generation Partnership Project; Technical Specification Group Radio Access Network; NR; Physical layer procedures for control (Release 15)", Mar. 2018.
3GPP TS 38.214 V15.1.0, "3rd Generation Partnership Project; Technical Specification Group Radio Access Network; NR; Physical layer procedures for data (Release 15)", Mar. 2018.
3GPP TS 38.215 V15.1.0, "3rd Generation Partnership Project; Technical Specification Group Radio Access Network; NR; Physical layer measurements (Release 15)", Mar. 2018.
3GPP TS 38.300 V15.1.0, "3rd Generation Partnership Project; Technical Specification Group Radio Access Network; NR; NR and NG-RAN Overall Description; Stage 2 (Release 15)", Mar. 2018.
3GPP TS 38.321 V15.1.0, "3rd Generation Partnership Project; Technical Specification Group Radio Access Network; NR; Medium Access Control (MAC) protocol specification (Release 15)", Mar. 2018.
3GPP TS 38.322 V15.1.0, "3rd Generation Partnership Project; Technical Specification Group Radio Access Network; NR; Radio Link Control (RLC) protocol specification (Release 15)", Mar. 2018.
3GPP TS 38.323 V15.1.0, "3rd Generation Partnership Project; Technical Specification Group Radio Access Network; NR; Packet Data Convergence Protocol (PDCP) specification (Release 15)", Mar. 2018.
3GPP TS 38.331 V15.1.0, "3rd Generation Partnership Project; Technical Specification Group Radio Access Network; NR; Radio Resource Control (RRC) protocol specification (Release 15)", Mar. 2018.
3GPP TS 38.401 V15.1.0, "3rd Generation Partnership Project; Technical Specification Group Radio Access Network; NG-RAN; Architecture description (Release 15)", Mar. 2018.
3GPP TS 38.410 V0.8.0, "3rd Generation Partnership Project; Technical Specification Group Radio Access Network; NG-RAN; NG general aspect and principles (Release 15)", Mar. 2018.
3GPP TS 38.413 V0.7.0, "3rd Generation Partnership Project; Technical Specification Group Radio Access Network; NG-RAN; NG Application Protocol (NGAP) (Release 15)", Mar. 2018.
3GPP TS 38.420 V0.7.0, "3rd Generation Partnership Project; Technical Specification Group Radio Access Network; NG-RAN; Xn general aspects and principles (Release 15)", Mar. 2018.
3GPP TS 38.423 V0.7.0, 3rd Generation Partnership Project; Technical Specification Group Radio Access Network; NG-RAN; Xn application protocol (XnAP) (Release 15), Mar. 2018.
3GPP TS 38.470 V15.1.0, "3rd Generation Partnership Project; Technical Specification Group Radio Access Network; NG-RAN; F1 general aspects and principles (Release 15)", Mar. 2018.
3GPP TS 38.473 V15.1.1, "3rd Generation Partnership Project; Technical Specification Group Radio Access Network; NG-RAN; F1 application protocol (F1AP) (Release 15)", Apr. 2018.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.

(56) References Cited

OTHER PUBLICATIONS

3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V14.3.1, "3rd Generation Partnership Project; Technical Specification Group Radio Access Network; Study on channel model for frequency spectrum above 6 GHz (Release 14)", Jul. 2017.
3GPP TR 38.912 V14.1.0, "3rd Generation Partnership Project; Technical Specification Group Radio Access Network; Study on New Radio (NR) access technology (Release 14)", Jun. 2017.
3GPP TR 38.913 V14.3.0, "3rd Generation Partnership Project; Technical Specification Group Radio Access Network; Study on Scenarios and Requirements for Next Generation Access Technologies; (Release 14)", Jun. 2017.
Samsung ,Change Request for "Miscellaneous corrections", 3GPP TSG-RAN WG2 Meeting #101bis, R2-1804572, Sanya, China, Apr. 16-20, 2018.
3GPP TS 36.133 V15.2.0, "3rd Generation Partnership Project; Technical Specification Group Radio Access Network; Evolved Universal Terrestrial Radio Access (E-UTRA); Requirements for support of radio resource management (Release 15)", Mar. 2018.
3GPP TS 36.214 V15.1.0, "3rd Generation Partnership Project; Technical Specification Group Radio Access Network; Evolved Universal Terrestrial Radio Access (E-UTRA); Physical layer; Measurements (Release 15)", Mar. 2018.
3GPP TR 36.912 V14.0.0, "3rd Generation Partnership Project; Technical Specification Group Radio Access Network; Feasibility study for Further Advancements for E-UTRA (LTE-Advanced) (Release 14)", Mar. 2017.
3GPP TS 37.324 V1.2.0, "3rd Generation Partnership Project; Technical Specification Group Radio Access Network; E-UTRA and NR; Service Data Adaptation Protocol (SDAP) specification (Release 15)", Mar. 2018.
Fujitsu, "CR to SR cancellation", Agenda Item: 10.3.1.5 (SR), 3GPP TSG-RAN WG2 Meeting #101bis, R2-1804942, Sanya, China, Apr. 16-20, 2018. Cited in ISR for PCT/JP2018/017679.
Vivo, "Discussion on the cancellation of RACH procedure", Agenda Item: 10.3.1.4.3, 3GPP TSG-RAN WG2 Meeting #101bis, R2-1804686, Sanya, China, Apr. 16-20, 2018. Cited in ISR for PCT/JP2018/017679.
Vivo, "SR and BSR cancel due to Duplication deactivation", Agenda Item: 10.3.1.11, 3GPP TSG-RAN WG2 Meeting #101bis, R2-1804677, Sanya, China, Apr. 16-20, 2018. Cited in ISR for PCT/JP2018/017679.
Fujitsu et al., Draft Change Request for "CR to SR RA procedure cancellation", 3GPP TSG-RAN WG2 Meeting #102, R2-R2-1808662, Busan, South Korea, May 21-25, 2018. Cited in ISR for PCT/JP2018/017679.
Written Opinion of the International Searching Authority issued for corresponding International Patent Application No. PCT/JP2018/017679 dated Jun. 26, 2018, with a partial English translation.
Non-Final Office Action issued by the USPTO dated Apr. 15, 2019 for corresponding U.S. Appl. No. 16/225,276.

\* cited by examiner

5.4.4 Scheduling Request

...

The MAC entity may stop, if any, ongoing Random Access procedure due to a pending SR which has no valid PUCCH resources configured, which was initiated by MAC entity prior to the MAC PDU assembly. Such a Random Access procedure may be stopeed when the MAC PDU is transmitted using an UL grant other than an UL grant provided by Random Access Response and addressed to the C-RNTI when this PDU includes a BSR MAC CE which contains buffer status up to (and including) the last event that triggered a BSR (see subclause 5.4.5) prior to the MAC PDU assembly, or when the UL grant(s) can accommodate all pending data available for transmission.

TERMINAL DEVICE, BASE STATION DEVICE, WIRELESS COMMUNICATION SYSTEM, AND SCHEDULING REQUEST METHOD

CROSS-REFERENCE TO RELATED APPLICATION(S)

This application is a continuation of U.S. application Ser. No. 16/225,276, filed Dec. 19, 2018, now pending, which is a continuation of International Application No. PCT/JP2018/017679, filed on May 7, 2018, the entire contents of each are herein incorporated by reference.

FIELD

The embodiment discussed herein is related to a terminal device, a base station device, a wireless communication system, and a scheduling request method.

BACKGROUND

In current networks, traffic of mobile terminals (smartphones and feature phones) accounts for most of network resources. In addition, traffic used by the mobile terminals tends to increase continuously.

Meanwhile, with the development of Internet of things (IoT) services (for example, transportation systems, smart meters, and monitoring systems for devices and the like), there is a demand to cope with services that have various requirements. Therefore, in the communication standards of the fifth generation mobile communication (5G or new radio (NR)), technologies that realize a higher data rate, a larger capacity, and a lower delay are desired, in addition to the standard technologies of the fourth generation mobile communication (4G) (for example, see Non Patent Documents 1 to 11). As for the 5G communication standards, working groups of the 3GPP (for example, TSG-RAN WG1, TSG-RAN WG2, and the like) have been examining technologies (Non Patent Documents 12 to 39). The first version of the 5G standard specifications defined by the 3GPP has been released.

As described above, to cope with a wide variety of services, in the 5G, a large number of use cases that are classified into an enhanced mobile broadband (eMBB), a massive machine type communications (MTC), and a ultra-reliable and low latency communication (URLLC) are supposed to be supported.

In the wireless network, it is necessary to allocate a wireless resource to allow a terminal device to transmit data. Therefore, the terminal device performs a scheduling request procedure with respect to a base station device to which the terminal device is connected. When a physical uplink control channel (PUCCH) resource is allocated to transmit a scheduling request (SR), the terminal device transmits the SR using the PUCCH resource. In other words, a PUCCH is used as a transmission channel for the SR.

The base station device that has received the SR provides an UL grant (uplink transmission permission) for uplink transmission performed by the terminal device. When the terminal device receives the UL grant, the terminal device reports an amount of data stored in a data buffer to the base station device. This report may be referred to as a buffer status report (BSR). The base station device that has received the BSR recognizes the amount of data stored in the data buffer of the terminal device, allocates an appropriate amount of an uplink wireless resource to the terminal device, and transmits an UL grant indicating the wireless resource to the terminal device. Consequently, the terminal device transmits uplink data to the base station device using the notified wireless resource. The above-described procedure may be referred to as an SR PUCCH.

In contrast, when the PUCCH resource is not enough, the base station device does not allocate a PUCCH resource for the SR to the terminal device in some cases. In this case, the terminal device needs to perform a random access (RA) procedure in order to transmit uplink data. In the RA procedure, four signals are transmitted and received between the terminal device and the base station device. Specifically, messages as described below are transmitted and received.

Msg1 (from the terminal device to the base station device): including a random access preamble. A random access channel (RACH) is used as a channel.

Msg2 (from the base station device to the terminal device): including a random access response. A physical downlink shared channel (PDSCH) is used as a channel. Information to be transmitted includes identification information on the random access preamble in Msg1 received by the base station device and an UL grant for a message to be transmitted on the next using uplink channel.

Msg3 (from the terminal device to the base station device): a physical uplink shared channel (PUSCH) is used as a channel. A wireless resource for transmitting Msg3 is notified by the UL grant of Msg2. Further, an identifier of the terminal device is transmitted by Msg3. As a result, the base station device that receives Msg3 is able to identify the terminal device that is performing the RA procedure.

Msg4 (from the base station device to the terminal device): including an UL grant. The terminal device that receives the UL grant determines that the RA procedure is successful.

If the RA procedure is successful similarly to the SR PUCCH, the terminal device transmits a BSR using the UL grant of Msg4, receives an UL grant for allocating an appropriate amount of an uplink wireless resource from the base station device, and transmits uplink data. The above-described procedure may be referred to as an SR RACH.

As a procedure for cancelling the SR RACH, a study is being conducted to cancel the above-described procedure when an UL grant is allocated to a cell-radio network temporary identifier (C-RNTI) and when a media access control (MAC) protocol data unit (PDU) transmitted by the PUSCH includes a BSR that reflects the latest buffer status (data storing status) of the terminal device (Non Patent Documents 21 and 39).

[Non Patent Document 1] 3GPP TS 36.211 V15.1.0 (2018 March)

[Non Patent Document 2] 3GPP TS 36.212 V15.1.0 (2018 March)

[Non Patent Document 3] 3GPP TS 36.213 V15.1.0 (2018 March)

[Non Patent Document 4] 3GPP TS 36.300 V15.1.0 (2018 March)

[Non Patent Document 5] 3GPP TS 36.321 V15.1.0 (2018 March)

[Non Patent Document 6] 3GPP TS 36.322 V15.0.1 (2018 April)

[Non Patent Document 7] 3GPP TS 36.323 V14.5.0 (2017 December)

[Non Patent Document 8] 3GPP TS 36.331 V15.1.0 (2018 March)

[Non Patent Document 9] 3GPP TS 36.413 V15.1.0 (2018 March)

[Non Patent Document 10] 3GPP TS 36.423 V15.1.0 (2018 March)
[Non Patent Document 11] 3GPP TS 36.425 V14.1.0 (2018 March)
[Non Patent Document 12] 3GPP TS 37.340 V15.1.0 (2018 March)
[Non Patent Document 13] 3GPP TS 38.201 V15.0.0 (2017 December)
[Non Patent Document 14] 3GPP TS 38.202 V15.1.0 (2018 March)
[Non Patent Document 15] 3GPP TS 38.211 V15.1.0 (2018 March)
[Non Patent Document 16] 3GPP TS 38.212 V15.1.1 (2018 April)
[Non Patent Document 17] 3GPP TS 38.213 V15.1.0 (2018 March)
[Non Patent Document 18] 3GPP TS 38.214 V15.1.0 (2018 March)
[Non Patent Document 19] 3GPP TS 38.215 V15.1.0 (2018 March)
[Non Patent Document 20] 3GPP TS 38.300 V15.1.0 (2018 March)
[Non Patent Document 21] 3GPP TS 38.321 V15.1.0 (2018 March)
[Non Patent Document 22] 3GPP TS 38.322 V15.1.0 (2018 March)
[Non Patent Document 23] 3GPP TS 38.323 V15.1.0 (2018 March)
[Non Patent Document 24] 3GPP TS 38.331 V15.1.0 (2018 March)
[Non Patent Document 25] 3GPP TS 38.401 V15.1.0 (2018 March)
[Non Patent Document 26] 3GPP TS 38.410 V0.8.0 (2018 March)
[Non Patent Document 27] 3GPP TS 38.413 V0.7.0 (2018 March)
[Non Patent Document 28] 3GPP TS 38.420 V0.7.0 (2018 March)
[Non Patent Document 29] 3GPP TS 38.423 V0.7.0 (2018 March)
[Non Patent Document 30] 3GPP TS 38.470 V15.1.0 (2018 March)
[Non Patent Document 31] 3GPP TS 38.473 V15.1.1 (2018 April)
[Non Patent Document 32] 3GPP TR 38.801 V14.0.0 (2017 March)
[Non Patent Document 33] 3GPP TR 38.802 V14.2.0 (2017 September)
[Non Patent Document 34] 3GPP TR 38.803 V14.2.0 (2017 September)
[Non Patent Document 35] 3GPP TR 38.804 V14.0.0 (2017 March)
[Non Patent Document 36] 3GPP TR 38.900 V14.3.1 (2017 July)
[Non Patent Document 37] 3GPP TR 38.912 V14.1.0 (2017 June)
[Non Patent Document 38] 3GPP TR 38.913 V14.3.0 (2017 June)
[Non Patent Document 39] R2-1804572, "Miscellaneous corrections", 3GPP TSG RAN WG2 Meeting #101bis, Sanya, China, 16-20 Apr. 2018

However, in the currently-examined procedure of cancelling the SR RACH, there is a problem in that, in some cases, it is uncertain whether cancellation is to be performed. Specifically, in certain scheduling in which a periodic wireless resource is allocated like in semi-persistent scheduling (SPS) in long term evolution-advanced (LTE-A) for example, the terminal device may be able to transmit a BSR even without receiving an UL grant from the base station device. In other words, in some cases, the terminal device may transmit a BSR using an uplink wireless resource that has been allocated in advance. In this case, the UL grant is not used to transmit the BSR, so that the SR RACH is not cancelled. Therefore, even though the BSR is already transmitted, the SR RACH procedure for transmitting a BSR is continued and an unnecessary process is performed.

SUMMARY

According to an aspect of an embodiment, a terminal device includes: a transmitter configured to transmit a scheduling request for an uplink (UL) resource; and a controller configured to stop a random access procedure when MAC PDU is transmitted using a UL grant other than a UL grant provided by random access response in the random access procedure.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. The present invention is not limited by the embodiment below.

Figure 1:
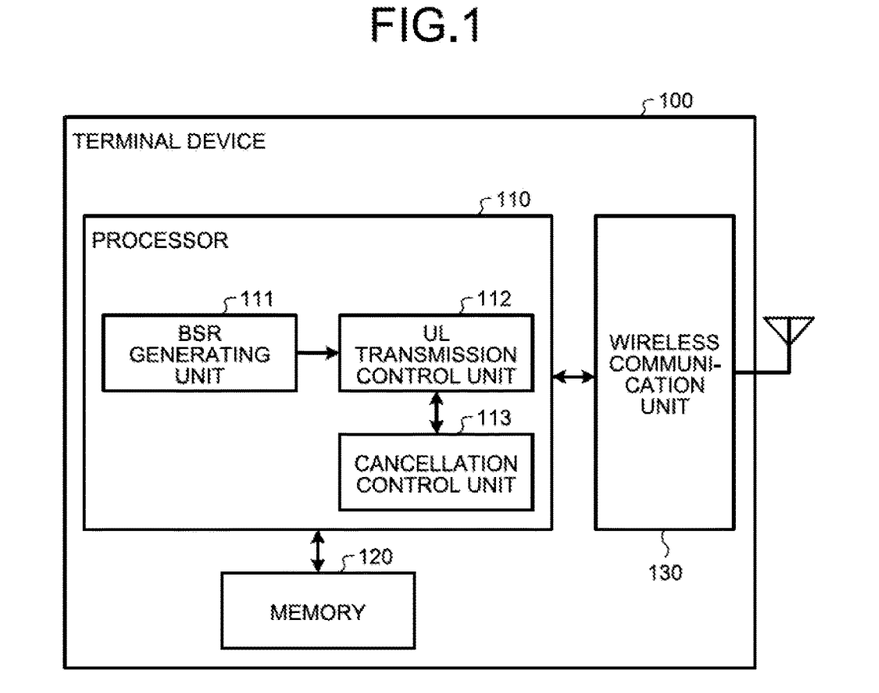
FIG. 1 is a block diagram illustrating a configuration of a terminal device according to one embodiment.

FIG. 1 is a block diagram illustrating a configuration of a terminal device 100 according to one embodiment. The terminal device 100 illustrated in FIG. 1 includes a processor 110, a memory 120, and a wireless communication unit 130.

The processor 110 includes, for example, a central processing unit (CPU), a field programmable gate array (FPGA), a digital signal processor (DSP), or the like, and controls the entire terminal device 100. Specifically, the processor 110 includes a buffer status report (BSR) generating unit 111, an uplink (UL) transmission control unit 112, and a cancellation control unit 113.

The BSR generating unit 111, when executing a scheduling request for requesting uplink transmission, refers to a transmission buffer of the terminal device 100 and recognizes an amount of data to be transmitted through uplink. In other words, the BSR generating unit 111 recognizes an amount of data stored in the transmission buffer of the terminal device 100. Then, the BSR generating unit 111 generates a buffer status report (BSR) for reporting the amount of stored data.

The UL transmission control unit 112 controls uplink transmission from the terminal device 100 to a base station device. Specifically, when executing a scheduling request for requesting uplink transmission, the UL transmission control unit 112 determines whether a PUCCH wireless resource for the scheduling request is allocated in advance to the terminal device 100. If the PUCCH wireless resource is allocated, the UL transmission control unit 112 causes the wireless communication unit 130 to transmit the scheduling request using the allocated PUCCH wireless resource. Further, if a periodic wireless resource is allocated in advance to the terminal device 100 for example, the UL transmission control unit 112 may cause the wireless communication unit 130 to transmit the scheduling request and a BSR generated by the BSR generating unit 111, by using the wireless resource.

In contrast, if the PUCCH wireless resource is not allocated, the UL transmission control unit 112 executes the scheduling request through a random access procedure, and transmits and receives various messages. Specifically, the UL transmission control unit 112 causes the wireless communication unit 130 to transmit a random access preamble using a random access channel (RACH). Then, upon receiving a random access response including identification information on the random access preamble transmitted by the terminal device 100 and an UL grant, the UL transmission control unit 112 causes the wireless communication unit 130 to transmit the identification information on the terminal device 100 using a physical uplink shared channel (PUSCH) allocated by the UL grant. Thereafter, upon receiving an UL grant indicating that the random access procedure is successful, the UL transmission control unit 112 causes the wireless communication unit 130 to transmit the BSR generated by the BSR generating unit 111.

Meanwhile, the UL transmission control unit 112 notifies the cancellation control unit 113 of messages that are transmitted and received in the random access procedure. If an instruction to cancel the random access procedure is issued by the cancellation control unit 113, the random access procedure being executed, i.e., the ongoing random access procedure, is cancelled.

The cancellation control unit 113 determines whether to cancel the random access procedure that is executed when scheduling is requested, on the basis of contents of messages transmitted and received in the random access procedure and a status of allocation of a wireless resource to the terminal device 100. Specifically, when the BSR is transmitted using a wireless resource, which has been allocated in advance to the terminal device 100, during execution of the random access procedure, the cancellation control unit 113 cancels the random access procedure that is being performed, i.e., the ongoing random access procedure. In other words, when a periodic wireless resource is allocated to the terminal device 100 and the BSR is transmitted using the wireless resource for example, the cancellation control unit 113 cancels the random access procedure even when an UL grant is not received.

Further, when a BSR is transmitted in response to the UL grant that is included in the random access response during execution of the random access procedure for example, the cancellation control unit 113 determines that the random access procedure is not to be cancelled but to be continued. In other words, when the BSR is transmitted together with the identification information on the terminal device 100 in response to the UL grant that is received during the random access procedure, the cancellation control unit 113 continues the random access procedure to complete reception of a last UL grant.

The memory 120 includes, for example, a random access memory (RAM), a read only memory (ROM), or the like, and stores therein information used by the processor 110 to perform processes.

The wireless communication unit 130 performs wireless transmission process, such as digital-to-analog (D/A) conversion and up-conversion, on transmission data generated by the processor 110, and wirelessly transmits the data via an antenna. Further, the wireless communication unit 130 performs wireless reception process, such as down-conversion and analog-to-digital (A/D) conversion, on data that is wirelessly received via the antenna, and outputs the data to the processor 110.

Figure 2:
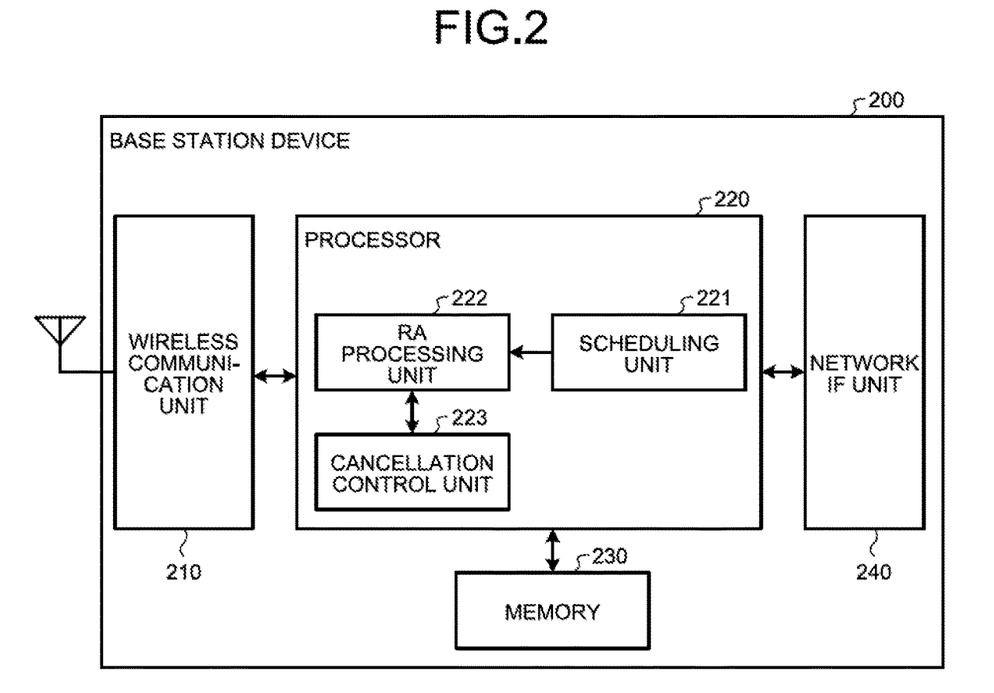
FIG. 2 is a block diagram illustrating a configuration of a base station device according to one embodiment.

FIG. 2 is a block diagram illustrating a configuration of a base station device 200 according to one embodiment. The base station device 200 illustrated in FIG. 2 includes a wireless communication unit 210, a processor 220, a memory 230, and a network interface (IF) unit 240.

The wireless communication unit 210 performs wireless reception process, such as down-conversion and A/D conversion, on reception data that is wirelessly received via an antenna, and outputs the data to the processor 220. Further, the wireless communication unit 210 performs wireless transmission process, such as D/A conversion and up-conversion, on transmission data generated by the processor 220, and wirelessly transmits the data via the antenna.

The processor 220 includes, for example, a CPU, an FPGA, a DSP, or the like, and comprehensively controls the entire base station device 200. Specifically, the processor 220 includes a scheduling unit 221, a random access (RA) processing unit 222, and a cancellation control unit 223.

The scheduling unit 221 performs scheduling of allocating an uplink wireless resource to the terminal device 100 when a scheduling request is transmitted from the terminal device 100. Specifically, the scheduling unit 221 acquires a BSR transmitted from the terminal device 100, and determines a wireless resource for transmitting data stored in the transmission buffer of the terminal device 100.

The RA processing unit 222 performs a random access process of transmitting and receiving various messages when the scheduling request issued by the terminal device 100 is executed through the random access procedure. Specifically, upon receiving a random access preamble, the RA processing unit 222 assigns identification information to the random access preamble and causes the wireless communication unit 210 to transmit a random access response including the identification information and an UL grant that indicates a wireless resource for transmitting a next uplink message. Upon receiving the identification information on the terminal device 100, the RA processing unit 222 causes the wireless communication unit 210 to transmit an UL grant indicating the wireless resource that is allocated to the terminal device 100 by the scheduling unit 221.

The cancellation control unit 223 determines whether to cancel the random access procedure that is executed, i.e., the ongoing random access procedure, when scheduling is requested, on the basis of contents of messages transmitted and received in the random access procedure and a status of allocation of a wireless resource to the terminal device 100. Specifically, when a BSR is received using a wireless resource, which has been allocated in advance to the terminal device 100, during execution of the random access procedure, the cancellation control unit 223 causes the RA processing unit 222 to cancel the random access process that is being executed, i.e., the ongoing random access procedure. In other words, when a periodic wireless resource is allocated to the terminal device 100 and the BSR is received using the wireless resource for example, the cancellation control unit 223 cancels the random access process regardless of whether an UL grant is transmitted or not.

Further, when a BSR is received in response to the UL grant that is included in the random access response during execution of the random access procedure for example, the cancellation control unit 223 determines that the random access procedure is not to be cancelled but to be continued. In other words, when the BSR is received together with the identification information on the terminal device 100 in response to the UL grant that is received during the random access procedure, the cancellation control unit 223 continues the random access procedure to complete transmission of a last UL grant.

The memory 230 includes, for example, a RAM, a ROM, or the like, and stores therein information used by the processor 220 to perform processes.

The network IF unit 240 is, for example, an interface that is connected, with wire, to a device constituting a core network.

Figure 3:
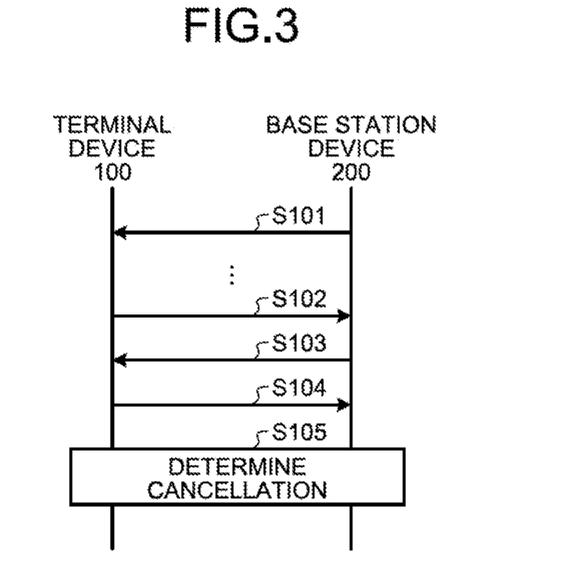
FIG. 3 is a sequence diagram illustrating a concrete example of a scheduling request.

Next, a concrete example of the scheduling request in a wireless communication system that includes the terminal device 100 and the base station device 200 configured as described above will be described with reference to FIGS. 3 and 4. FIG. 3 is a sequence diagram illustrating a concrete example of the scheduling request executed through the random access procedure.

In the wireless communication system illustrated in FIG. 3, before execution of a scheduling request, the base station device 200 allocates a periodic wireless resource to the terminal device 100 in advance, and the terminal device 100 is notified of a wireless resource available to the terminal device 100 for uplink transmission (Step S101). Therefore, even when an explicit UL grant is not received, the terminal device 100 is able to perform uplink transmission using the periodic wireless resource that is allocated in advance. However, the periodic wireless resource allocated in advance is limited, so that when data to be transmitted using uplink is generated, the terminal device 100 requests the base station device 200 to perform uplink scheduling, by issuing a scheduling request using a PUCCH or an RACH. In this example, an explanation will be continued based on the assumption that the scheduling request is executed through the random access procedure using an RACH.

In the random access procedure, the terminal device 100 transmits the random access preamble to the base station device 200 (Step S102). Upon receiving the random access preamble, the base station device 200 assigns identification information to the random access preamble, and transmits a random access response including the identification information and an UL grant indicating a wireless resource that is available for next uplink transmission to the terminal device 100 (Step S103).

Meanwhile, while the random access procedure is being executed, if a transmission timing of the periodic wireless resource that has been allocated in advance to the terminal device 100 comes, the terminal device 100 may transmit a BSR using the periodic wireless resource in order to promptly start uplink transmission (Step S104). The transmission of the BSR is not based on the UL grant included in the random access response, but may be generated before the terminal device 100 receives the random access response. In other words, the terminal device 100 may promptly transmit the BSR using the wireless resource that has been allocated in advance, regardless of whether the UL grant is received or not.

When the BSR is transmitted, the cancellation control unit 113 of the terminal device 100 determines whether to cancel the random access procedure (Step S105). Similarly, the cancellation control unit 223 of the base station device 200 determines whether to cancel the random access process performed by the RA processing unit 222 (Step S105). In the determination of the cancellation at this time, it is determined that the random access procedure is to be cancelled when the BSR is transmitted in response to the UL grant, or when the BSR is transmitted using the periodic wireless resource that has been allocated in advance to the terminal device 100. In other words, not only when the BSR is transmitted in response to the UL grant, but also when the BSR is transmitted by the wireless resource that has been allocated in advance regardless of presence or absence of the UL grant, the random access procedure is cancelled.

After the random access procedure is cancelled, transmission and reception of messages of the random access procedure performed by the UL transmission control unit 112 are stopped in the terminal device 100, and transmission and reception of messages of the random access procedure performed by the RA processing unit 222 are stopped in the base station device 200. With this configuration, it is possible to prevent unnecessary continuation of the random access procedure after the terminal device 100 transmits the BSR and the base station device 200 is enabled to execute scheduling. In other words, it is possible to appropriately cancel the random access procedure.

Figure 4:
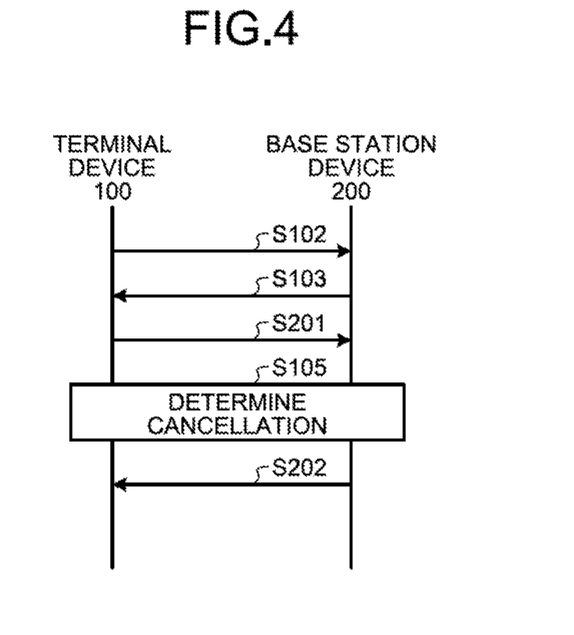
FIG. 4 is a sequence diagram illustrating another concrete example of the scheduling request.

FIG. 4 is a sequence diagram illustrating another concrete example of the scheduling request executed by the random access procedure. In FIG. 4, the same components as those illustrated in FIG. 3 are denoted by the same reference signs.

In the wireless communication system illustrated in FIG. 4, a periodic wireless resource is not allocated to the terminal device 100 in advance, which is different from the example in FIG. 3. Therefore, when data to be transmitted using uplink is generated, the terminal device 100 requests the base station device 200 to perform uplink scheduling by issuing a scheduling request using a PUCCH or an RACH. In this example, an explanation will be given based on the assumption that the scheduling request is executed through the random access procedure using an RACH.

In the random access procedure, the terminal device 100 transmits a random access preamble to the base station device 200 (Step S102). Upon receiving the random access preamble, the base station device 200 assigns identification information to the random access preamble, and transmits a random access response including the identification information and an UL grant indicating a wireless resource available for next uplink transmission to the terminal device 100 (Step S103).

Upon receiving the random access response, the terminal device 100 transmits the identification information on the terminal device 100 to the base station device 200 in response to the UL grant included in the random access response (Step S201). At this time, the terminal device 100 may transmit a BSR together with the identification information on the terminal device 100 in order to promptly start uplink transmission.

When the BSR is transmitted, the cancellation control unit 113 of the terminal device 100 determines whether to cancel the random access procedure (Step S105). Similarly, the cancellation control unit 223 of the base station device 200 determines whether to cancel the random access process performed by the RA processing unit 222 (Step S105). In the determination of the cancellation at this time, it is determined that the random access procedure is to be cancelled when the BSR is transmitted in response to the UL grant. However, when the BSR is transmitted in response to the UL grant included in the random access response, it is determined that the random access procedure is not to be cancelled but to be continued. In other words, the random access procedure is cancelled when the BSR is transmitted in response to the UL grant except when the BSR is transmitted in response to the UL grant included in the random access response.

When the BSR is transmitted in response to the UL grant included in the random access response, the random access procedure is continued; therefore, the base station device 200 transmits an UL grant for permitting the terminal device 100 to perform uplink transmission (Step S202), and the random access procedure is completed. The UL grant transmitted at this time designates a wireless resource available to the terminal device 100 for uplink transmission. Therefore, the terminal device 100 is able to promptly start transmission of data stored in the transmission buffer. Further, after the random access procedure is completed, the base station device 200 performs scheduling in accordance with the BSR, and an UL grant is transmitted to the terminal device 100.

As described above, according to the embodiment, the random access procedure is cancelled when a buffer status report is transmitted in response to an UL grant other than a random access response while a scheduling request is being executed through the random access procedure, and when a buffer status report is transmitted by a periodic wireless resource that has been allocated in advance regardless of presence or absence of the UL grant. Therefore, when the buffer status report used for uplink scheduling is transmitted regardless of presence or absence of the UL grant, it is possible to prevent unnecessary execution of the random access procedure for transmitting the buffer status report. In other words, it is possible to appropriately cancel the random access procedure.

Furthermore, when a buffer status report is transmitted in response to an UL grant included in the random access response, the random access procedure is not cancelled but continued. Therefore, the UL grant that is transmitted in accordance with the random access procedure is excluded from a condition for cancelling the random access procedure, so that it is possible to prevent the random access procedure from being excessively cancelled.

Meanwhile, cancellation of the random access procedure may be described as stopping of a pending scheduling request, for example. In addition, cancellation of the random access procedure is performed by, for example, a MAC entity. Specifically, when a MAC PDU is to be transmitted using an UL grant (for example, a second UL grant) other than an UL grant (for example, a first UL grant) provided by (or expected to be provided by) a random access process, the MAC entity is able to stop a random access procedure that the MAC entity has started before building a MAC PDU and that is being executed, i.e., the ongoing random access procedure, for a pending scheduling request for which a valid PUCCH resource is not set.

Figure 5:
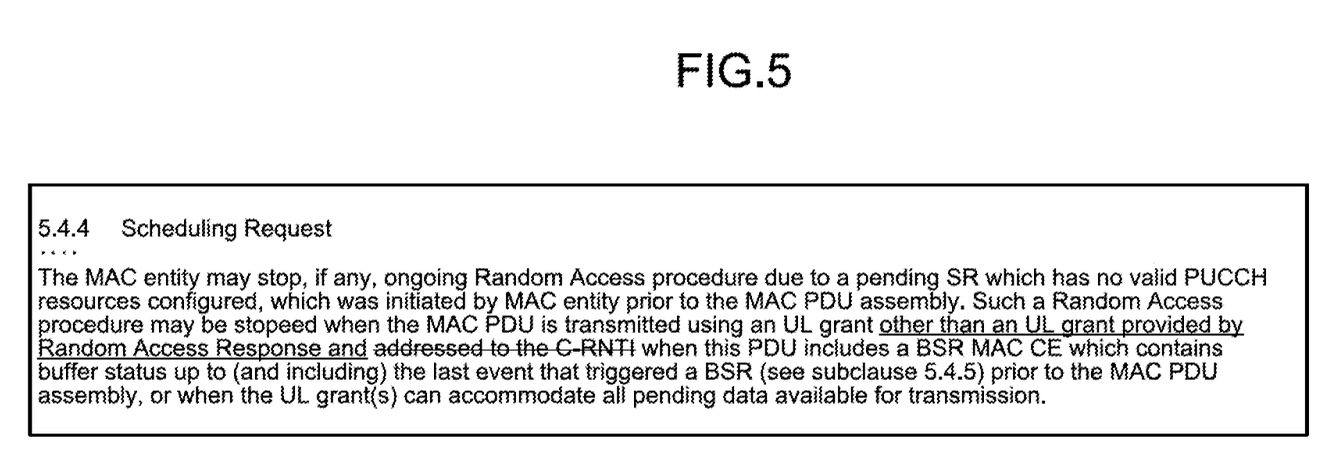
FIG. 5 is a diagram illustrating an example of description of contents in a standard specification document according to one embodiment.

Furthermore, with use of the contents of the embodiment described above, an item of a scheduling request described in, for example, Non Patent Literature 21 (TS38.321) may be updated as illustrated in FIG. 5, for example.

Moreover, cancellation (stopping) of the random access procedure may be performed in any state in the random access procedure. For example, the random access procedure may be cancelled depending on presence or absence of transmission of a random access response from the base station device 200 to the terminal device 100. Specifically, when the random access response is transmitted, the random access procedure is continued (not cancelled), and when the random access response is not transmitted, the random access procedure is cancelled. Furthermore, the terminal device 100 performs a process by assuming that the random access procedure is cancelled when the random access response is not received (when the random access response is not received for a predetermined time or when a different random access response is received).

According to one aspect of the terminal device, the base station device, the wireless communication system, and the scheduling request method, it is possible to appropriately cancel a random access procedure.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal device comprising:
a transmitter configured to transmit a scheduling request for an uplink (UL) resource; and
control circuitry configured to stop an ongoing random access procedure when a media access control protocol data unit (MAC PDU) is transmitted using a configured Uplink (UL) grant other than a UL grant provided by a random access response in the random access procedure, wherein the configured UL grant indicates a periodic wireless resource configured prior to the ongoing random access procedure,
wherein the MAC PDU includes a buffer status reporting an amount of stored data and a last event that triggered a BSR prior to assembling the MAC PDU.

2. The terminal device of claim 1, wherein stopping the ongoing random access procedure includes to stop receiving another UL grant after the MAC PDU that uses the configured UL grant is transmitted.

3. The terminal device of claim 1, wherein the random access procedure is configured to perform transmission of a random access preamble and reception of a random access response.

4. The terminal device of claim 1, wherein the MAC PDU is transmitted by using a resource assigned by the random access procedure.

5. The terminal device of claim 1, wherein the random access procedure is ongoing when the MAC PDU is transmitted using a resource that is provided by the random access procedure or the random access procedure is stopped when the MAC PDU is transmitted using a resource that is configured by a UL grant.

6. The terminal device of claim 1, wherein transmission of the buffer status report (BSR) is performed in the random access procedure.

7. The terminal device of claim 1, wherein the random access response is for a random access preamble.

8. The terminal device of claim 1, wherein the control circuitry is configured to stop all ongoing operations of the random access procedure in the terminal device.

9. A base station device comprising:
- a transmitter configured to transmit a random access response in a random access procedure or an uplink (UL) grant;
- a receiver configured to receive a media access control protocol data unit (MAC PDU) which is transmitted using a configured UL grant or to receive a MAC PDU which is transmitted using a UL grant provided by the random access response; and
- control circuitry configured to stop an ongoing random access procedure when the MAC PDU is transmitted using the configured UL grant other than the UL grant provided by the random access response in the random access procedure, wherein the configured UL grant indicates a periodic wireless resource configured prior to the ongoing random access procedure,
- wherein the MAC PDU includes a buffer status reporting an amount of stored data and a last event that triggered a BSR prior to assembling the MAC PDU.

10. The base station device of claim 9, wherein stopping the ongoing random access procedure includes to stop transmitting another UL grant after the MAC PDU that uses the configured UL grant is transmitted.

11. The base station device of claim 9, wherein the random access procedure is ongoing when the transmitter transmits the UL grant provided by the random access response.

12. The base station device of claim 9, wherein the random access procedure includes performing reception of a random access preamble and transmission of a random access response.

13. The base station device of claim 9, wherein the MAC PDU is received with a resource assigned by the random access procedure.

14. The base station device of claim 9, wherein either the random access procedure is ongoing when the MAC PDU is received with a resource provided by the random access procedure or the random access procedure is stopped when the MAC PDU is received with a resource provided by a UL grant.

15. The base station device of claim 9, wherein reception of the buffer status report (BSR) is performed in the random access procedure.

16. The base station device of claim 9, wherein the random access response is for a random access preamble.

17. A scheduling request method comprising:
- transmitting a scheduling request for an uplink (UL) resource; and
- stopping an ongoing random access procedure when a media access control protocol data unit (MAC PDU) is transmitted using a configured UL grant other than a UL grant by a random access response in the random access procedure, wherein the configured UL grant indicates a periodic wireless resource configured prior to the ongoing random access procedure,
- wherein the MAC PDU includes a buffer status reporting an amount of stored data and a last event that triggered a BSR prior to assembling the MAC PDU.

18. The scheduling request method of claim 17, wherein stopping the ongoing random access procedure includes to stop receiving another UL grant after the MAC PDU that uses the configured UL grant is transmitted.

\* \* \* \* \*